(12) United States Patent
Cai et al.

(10) Patent No.: US 12,373,183 B2
(45) Date of Patent: Jul. 29, 2025

(54) IMPROVING AN APPLICATION PROGRAMMING INTERFACE CALLING MECHANISM OF A PLATFORM CONFIGURED TO PROVIDE DATA OR SOFTWARE SERVICES

(71) Applicant: Beijing Volcano Engine Technology Co., Ltd., Beijing (CN)

(72) Inventors: Chengnan Cai, Beijing (CN); Hailong Zhang, Beijing (CN); Wenmin Xu, Beijing (CN); Tao Zhou, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/882,687

(22) Filed: Sep. 11, 2024

(65) Prior Publication Data
US 2025/0103302 A1    Mar. 27, 2025

(30) Foreign Application Priority Data
Sep. 22, 2023 (CN) .......................... 202311236159.9

(51) Int. Cl.
*G06F 8/51* (2018.01)
*G06F 8/30* (2018.01)

(52) U.S. Cl.
CPC . *G06F 8/51* (2013.01); *G06F 8/30* (2013.01)

(58) Field of Classification Search
CPC ..... G06F 8/30; G06F 8/33; G06F 8/36; G06F 8/73; G06F 9/541
(Continued)

(56) References Cited

U.S. PATENT DOCUMENTS

| 4,667,290 A * | 5/1987 | Goss et al. ................. G06F 8/47 |
| | | 717/147 |
| 11,748,358 B2 * | 9/2023 | Oliner et al. ......... G06F 16/245 |
| | | 706/62 |

(Continued)

FOREIGN PATENT DOCUMENTS

| CN | 114327492 A | 4/2022 |
| CN | 115718616 A | 2/2023 |
| WO | WO-2023056085 A1 * | 4/2023 ......... G06F 21/6245 |

OTHER PUBLICATIONS

"ChatGPT: A fast and efficient code language conversion tool"; https://zhuanlan.zhihu.com/p/619357193; Zhihu; accessed Sep. 13, 2024; 3 pages.

*Primary Examiner* — Qing Chen
(74) *Attorney, Agent, or Firm* — BakerHostetler

(57) ABSTRACT

A code generation method and apparatus, an electronic device and a medium are provided. The method includes: acquiring a first language SDK code of a software development kit, in which the software development kit includes an application programming interface, which is configured to call a resource of an open platform; importing the first language SDK code and preset first guidance information to a natural language generation model, in which the natural language generation model is configured to generate responsive answer information according to the guidance information; and acquiring a second language SDK code output by the natural language generation model; in which the first guidance information includes a second language type and interface naming specifying information, and the interface naming specifying information is used to specify that a naming way for the application programming interface is identical in the first language SDK code and the second language SDK code.

15 Claims, 5 Drawing Sheets

(58) Field of Classification Search
USPC .......................................................... 717/106
See application file for complete search history.

(56) References Cited

U.S. PATENT DOCUMENTS

| | | | |
|---|---|---|---|
| 2014/0372963 A1* | 12/2014 | Chandaria | G06F 8/00 |
| | | | 717/100 |
| 2017/0102925 A1* | 4/2017 | Ali | G06F 8/30 |
| 2019/0146784 A1* | 5/2019 | Kraus | G06F 8/73 |
| | | | 717/122 |
| 2022/0261227 A1* | 8/2022 | Witte | G06F 8/30 |
| 2023/0004382 A1* | 1/2023 | Kim | G06F 8/30 |
| 2023/0056085 A1* | 2/2023 | Doshi | G06F 8/36 |
| 2023/0062336 A1* | 3/2023 | Abraham et al. | G06F 8/33 |
| 2023/0205678 A1* | 6/2023 | Bollepally et al. | G06F 9/541 |
| | | | 717/124 |

* cited by examiner

IMPROVING AN APPLICATION PROGRAMMING INTERFACE CALLING MECHANISM OF A PLATFORM CONFIGURED TO PROVIDE DATA OR SOFTWARE SERVICES

This application claims the priority of Chinese Patent Application No. 202311236159.9 filed on Sep. 22, 2023, the disclosure of which is incorporated by reference herein in its entirety as part of the present application.

TECHNICAL FIELD

Embodiments of the present disclosure relate to a code generation method, apparatus, an electronic device and a medium.

BACKGROUND

With the development of computers, users can use electronic devices to implement various functions. For example, users can acquire various resources by the electronic devices.

In some scenarios, an open platform (e.g., a platform providing data or providing software services) has its own system and data, and has an application programming interface (API) disclosed, such that an external program can use resources of the system without altering a source code of the system. The open platform may provide a software development kit for interface forwarding to provide a uniform, convenient interface calling mechanism of the platform.

SUMMARY

The summary is provided to introduce concepts briefly, and these concepts will be described in detail in the following detailed description. The summary is neither intended to indicate the key features or essential features of the claimed technical solutions nor meant to limit the scope of the claimed technical solutions.

In a first aspect, the embodiments of the present disclosure provide a code generation method, the method includes: acquiring a first language SDK code of a software development kit, in which the software development kit includes an application programming interface, the application programming interface is configured to call a resource of an open platform; importing the first language SDK code and preset first guidance information to a natural language generation model, in which the natural language generation model is configured to generate responsive answer information according to the guidance information; and acquiring a second language SDK code output by the natural language generation model; in which the first guidance information includes a second language type and interface naming specifying information, and the interface naming specifying information is used to specify that a naming way for the application programming interface is identical in the first language SDK code and the second language SDK code.

In a second aspect, the embodiments of the present disclosure provide a code generation apparatus, the apparatus includes: a first acquiring unit, configured to acquire a first language SDK code of a software development kit, in which the software development kit includes an application programming interface, the application programming interface is configured to call resources of an open platform; an importing unit, configured to import the first language SDK code and preset first guidance information to a natural language generation model, in which the natural language generation model is configured to generate responsive answer information according to the guidance information; and a second acquiring unit, configured to acquire a second language SDK code output by the natural language generation model; in which the first guidance information includes a second language type and interface naming specifying information, and the interface naming specifying information is used to specify that a naming way for the application programming interface is identical in the first language SDK code and the second language SDK code.

In a third aspect, the embodiments of the present disclosure provide an electronic device, the electronic device includes: one or more processors; and a storage apparatus configured to store one or more programs, in which the one or more programs, when executed by the one or more processors, cause the one or more processors to implement the code generation method as described in the first aspect.

In a fourth aspect, the embodiments of the present disclosure provide a computer-readable medium, storing a computer program, the computer program, when executed by a processor, causes the code generation method as described in the first aspect to be implemented.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and components and elements may not necessarily be drawn to scale.

DETAILED DESCRIPTION

Figure 1:
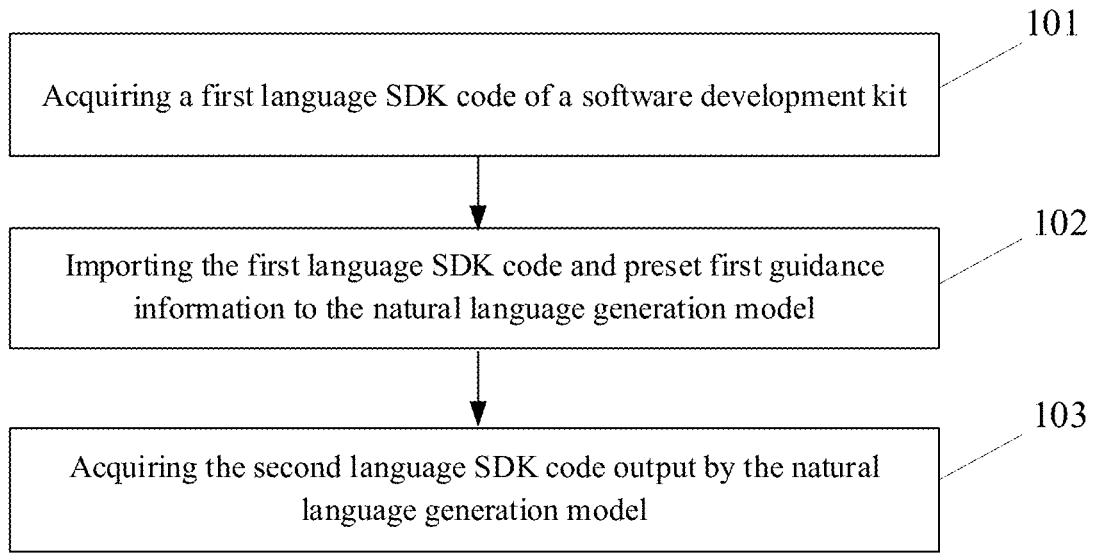
FIG. 1 is a flowchart of a code generation method provided by embodiments of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of messages or information exchanged between multiple devices in the embodiments of the present disclosure are for illustrative purposes only and are not intended to limit the scope of the messages or information.

In one or more embodiments of the present disclosure, a software development kit (SDK) is a set of related documents, example cases, and tools for assisting the developing of a type of software. Some platforms (e.g., platforms providing data or providing software services) have their own system and data, and have application programming interfaces (API) disclosed, such that an external program can use resources of the system without altering a source code of the system. Such platforms may provide a software development kit for interface forwarding to provide a uniform, convenient interface calling mechanism of the platforms. The SDK of the platform that is used for interface forwarding can support a plurality of programming languages (such as NodeJS, Java, Python, Go, PHP, and Rust) such that developers can rapidly integrate and use the platform in various environments.

In one or more embodiments of the present disclosure, for SDKs of a plurality of languages, an SDK of one language may be written first and then language transformation may be performed based on the written SDK to obtain the SDKs of the plurality of languages. Thus, an interface calling rule may be normalized such that the SDKs of a plurality of programming languages use the same code logic and the same API, thereby economizing on manpower. Only one writing process is required so that the product development and iteration can be accelerated. The SDKs of the plurality of languages are obtained by transformation, and there is no need to write or maintain the SDKs by those familiar with such languages. By contrast, in order to develop a multi-language SDK in some related techniques, a translation language needs to be fulfilled and then manually translated into another languages. There may be the following problems: manual translation can easily go wrong, which may easily result in code missing. Each language needs to be translated by those familiar with this language, leading to a high labor cost. The interface naming and field naming rules of the translated code may be different, and consequently, an error may be prone to occurring during calling by a user. The iteration speed is low, and each alteration requires those familiar with the language to perform updating manually.

In one or more embodiments of the present disclosure, the translation language (the translation language is a language to be transformed, e.g., using Go) may be selected according to a static state, a maturity degree, and a code quantity, and the code of the SDK is written using the translation language. The code of the translation language is then imported to a natural language generation model (e.g., constructed by the developer or using an open source model); moreover, a prompt (e.g., a text described in a natural language) using the natural language generation model is imported as an important input to the model for instructing the model to generate a content. Further, SDK codes of other languages output by the natural language generation model can be obtained.

In one or more embodiments of the present disclosure, a translation language type (the language type of the code input to the mode) and a translated language type (the language type of the code output from the model) may be specified in the prompt. The SDK codes of different language types can be obtained by changing the translated language type specified in the prompt.

In one or more embodiments of the present disclosure, the number and size of the translation file are of great concern. For example, some models may limit that no more than 24576 words can be input at a single time, and the content translated each time does not exceed 20000 characters. Therefore, the SDK code may be all written in one file to improve the translation accuracy.

In one or more embodiments of the present disclosure, a test case of the SDK may also be translated using the natural language generation model. For example, a test case of one language may be written first, and then a prompt and the test case are imported to the natural language generation model, and the natural language generation model outputs a test case of another language. Test cases of different language types can be obtained by changing the translated language type specified in the prompt.

With reference to FIG. 1, which is a flowchart of a code generation method provided by embodiments of the present disclosure. As shown in FIG. 1, the code generation method includes the following steps.

Step 101, acquiring a first language SDK code of a software development kit.

In this embodiment, an execution subject (e.g., a server and/or a terminal device) for the code generation method may acquire the first language SDK code of the software development kit.

Here, the software development kit includes an application programming interface which is configured to call a resource of an open platform.

The software development kit may also be referred to as SDK. The first language SDK code may be the SDK code of a first language type. For convenience, the first language SDK code may also be referred to as a first language SDK.

The first language SDK code may also be generated by manual editing, or may also be obtained by transformation through a natural language generation model.

The resource of the open platform may include, but is not limited to, data or system services of the open platform, etc.

The language type of the first language SDK code may also be referred to as the first language type. The first language type may be determined according to an actual application scenario, which will not be limited here.

Step 102: importing the first language SDK code and preset first guidance information to the natural language generation model.

Here, the natural language generation model is configured to generate responsive answer information according to the guidance information.

The guidance information may also be referred to as a prompt, the guidance information can be used to instruct the natural language generation model to transform the first language SDK code to a second language SDK code.

The natural language generation (NLG) model automatically generates a comprehensible natural language text using artificial intelligence and linguistic approaches. The NLG model reduces the difficulty of communication between human and computers and thus has been widely used in the fields of machine news writing, chatting robots, etc.

In some scenarios, the natural language generation model may be pre-trained. Pre-training a model is carried out on large-scale unmarked text language materials, and a text editor having powerful expression capability and generalization performance is obtained, and a significant performance effect is achieved on natural language understanding tasks (e.g., text classification, reading comprehension, information extraction). However, another task of NLP, that is, natural language generation, such as machine translation, text abstract, and dialogue generation not only requires good expression and encoding of an input text, but also needs a powerful decoder to generate a text. Thus, a generative pre-trained model may be proposed, such as UniLM, BART, T5, GPT, or the like.

For example, the first language SDK code and the preset first guidance information may be imported to the generative pre-trained model to obtain the second language SDK code.

As an example, the first guidance information may include: please translate this piece of code into Python code and not change the API name.

Step 103, acquiring the second language SDK code output by the natural language generation model.

Here, the first guidance information includes a second language type and interface naming specifying information. The second language type in the first guidance information may be used as the translated language.

Here, the interface naming specifying information is used to specify that a naming way for the application programming interface is identical in the first language SDK code and the second language SDK code.

It should be noted that according to the code generation method provided by this embodiment, the first language SDK code and the preset first guidance information are imported to the generative pre-trained model to obtain the second language SDK code, in which the first guidance information includes the second language type and the interface naming specifying information, and the interface naming specifying information is used to specify that the naming way of the application programming interface remain unchanged. Thus, in a scenario where an open platform provides SDK code generation, transformation of language types of the SDK code is realized by the natural language generation model. Before the transformation, the interface naming way is specified to remain unchanged and a transformed code in accordance with a normative interface naming way can be obtained. Accordingly, a uniform, convenient interface calling mechanism of the platform is provided, and the occurring probability of a calling error is reduced; the accuracy of translation is improved, and code missing is avoided; the labor cost is reduced; and rapid iteration can be realized in a scenario where the SDK code requires iteration.

Figure 3:
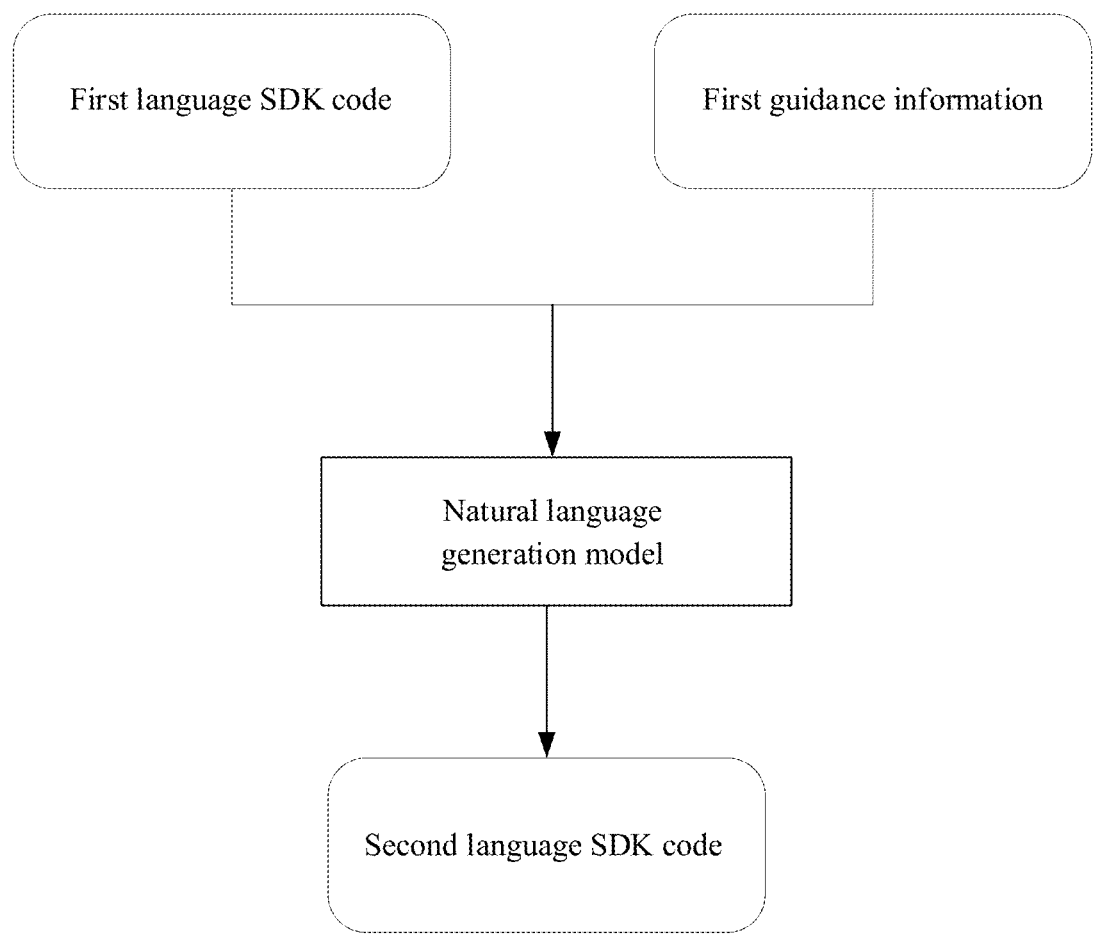
FIG. 3 is a schematic diagram of one application scenario of a code generation method provided by embodiments of the present disclosure.

As an example, with reference to FIG. 3, FIG. 3 illustrates the step of importing the first guidance information and the first language SDK code to the natural language generation model and the natural language generation model outputting the second language SDK code.

In some embodiments, the first language SDK code is imported to the natural language generation model in a single operation.

Here, the first language SDK code to be transformed is stored in the same file and then input to the natural language generation model in a single operation. Since the natural language generation model has the characteristic of understanding the entire code well and comprehensively, the accuracy of the second language SDK code obtained by transformation can be improved.

In some embodiments, the natural language generation model has a first number threshold for limiting the number of characters in a single input.

In some embodiments, the importing the first language SDK code and the preset first guidance information to the natural language generation model includes: storing the first language SDK code in at least two subfiles in response to the number of characters of the first language SDK code being greater than the first number threshold, in which codes in different subfiles have no calling relationship; and respectively importing the codes in the at least two subfiles to the natural language generation model.

In some embodiments, the acquiring the second language SDK code output by the natural language generation model includes: splicing outputs, corresponding to the at least two subfiles, of the natural language generation model to obtain the second language SDK code.

It should be noted that the first language SDK code is split into at least two pieces of code with low correlation for transformation in batches. Transformation results of transformation in batches are then spliced. When the first language SDK code is of a great quantity, the code is transformed using the natural language generation model having a limitation on input characters, thereby improving the applicability of transformation using the natural language generation model. Moreover, the correlation between the codes of different batches can be reduced, and the reduction of the accuracy rate of code transformation due to strong dependency of the code in a subfile on other codes can be avoided. Thus, the transformation accuracy is improved.

In some embodiments, the first guidance information further includes field naming specifying information, the field naming specifying information is used to specify that a field in a software development application package is identical in the first language SDK code and the second language SDK code.

Here, the field naming in the SDK remains consistent in the SDKs of different language types, thereby improving the normativity of SDK naming and guaranteeing the accuracy of calling platform resources.

In some embodiments, the first language type of the first language SDK code is a static language. In other words, the code of the static language may be selected as an input to the natural language generation model.

As an example, the used static language may include, but is not limited to any one selected from a group consisting of go, java, and rust.

Thus, based on the characteristic of more information carried by the static language, more context can be obtained by the natural language generation model, and the accuracy rate of the code output can be increased.

In some embodiments, the first language type of the first language SDK code may be determined according to an estimated SDK code quantity of each language type.

For example, a language with a less estimated code quantity may be selected from the static languages as the first language type.

The SDK codes of different language types are different in code quantity. Here, for the first language SDK code input to the natural language generation model, the first language type with a lower or lowest code quantity may be used. On the one hand, the workload of writing code by a person can be reduced; and on the other hand, the code quantity imported to the natural language generation model can be reduced, thereby reducing the calculation quantity and reducing the probability of storing the first language SDK code in a plurality of files.

In some embodiments, the first language type includes the GO type, and the second language type includes any one selected from a group consisting of NodeJS, Java, Python, PHP, and Rust.

The code of the GO language is of a small code quantity. That is, for the same content, the quantity of the code written in other languages is greater than the quantity of the code written in GO. The code obtained by using the GO language is briefer, and the GO language is static so that more contents can be generated.

In some embodiments, the code generation method further includes: acquiring a first language test case for testing the first language SDK code; importing the first language test case and second guidance information to the natural language generation model, in which the second guidance information includes a second language type; acquiring a second language test case output by the natural language generation model; and testing the second language SDK code based on the second language test case.

Figure 4:
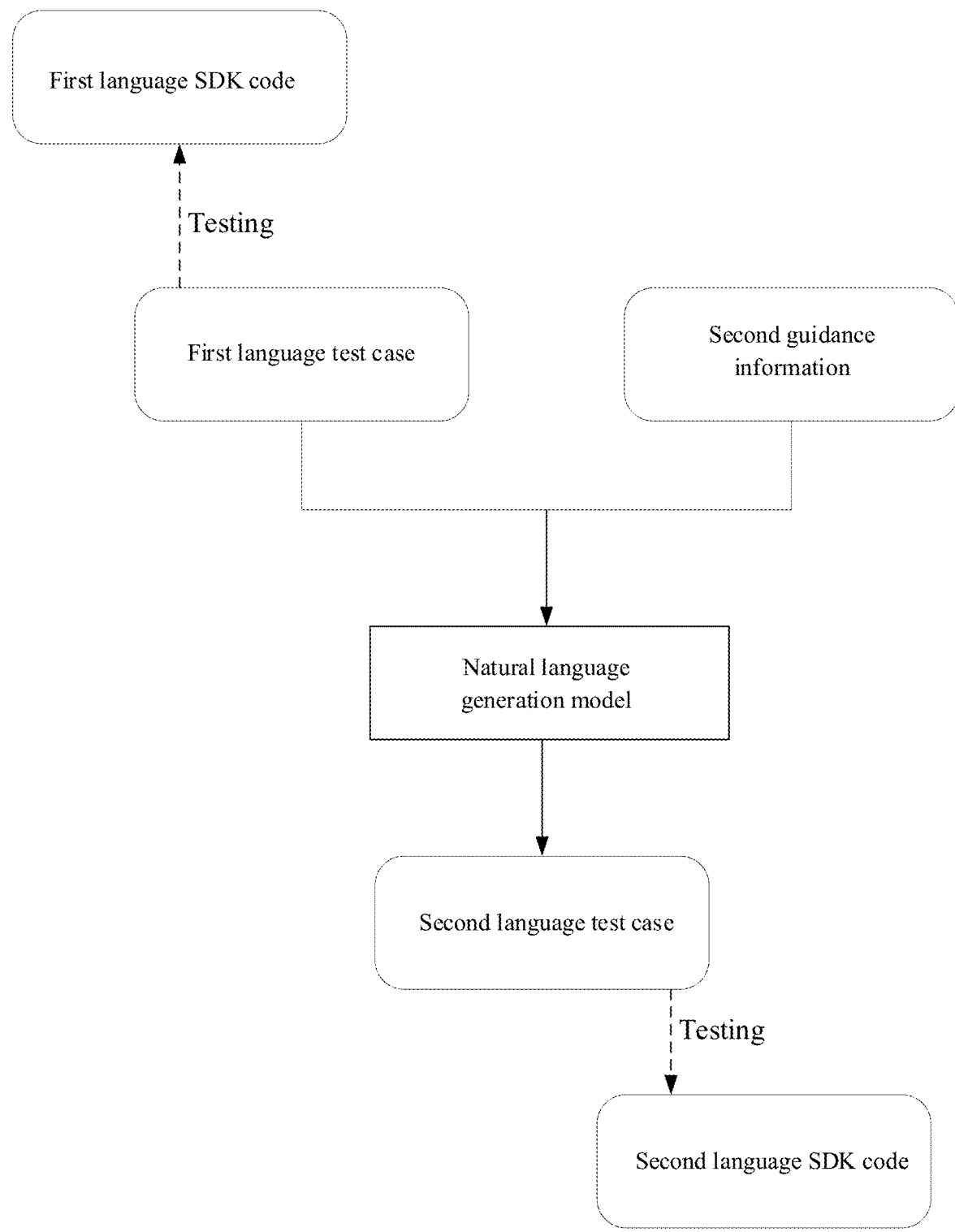
FIG. 4 is a schematic diagram of one application scenario of a code generation method provided by embodiments of the present disclosure.

As an example, with reference to FIG. 4, FIG. 4 illustrates the step of importing the first language test case to the natural language generation model and the natural language generation model outputting the second language test case. The first language test case is used for testing the first language SDK code, and the second language test case is used for testing the second language SDK code.

It should be noted that test cases corresponding to the SDK code are translated using the natural language generation model so that the generation speed of the test cases of different language types can be increased, and the accuracy of the test cases can be improved. Thus, rapid testing can be realized and the speed of putting the SDK online can be increased.

Figure 2:
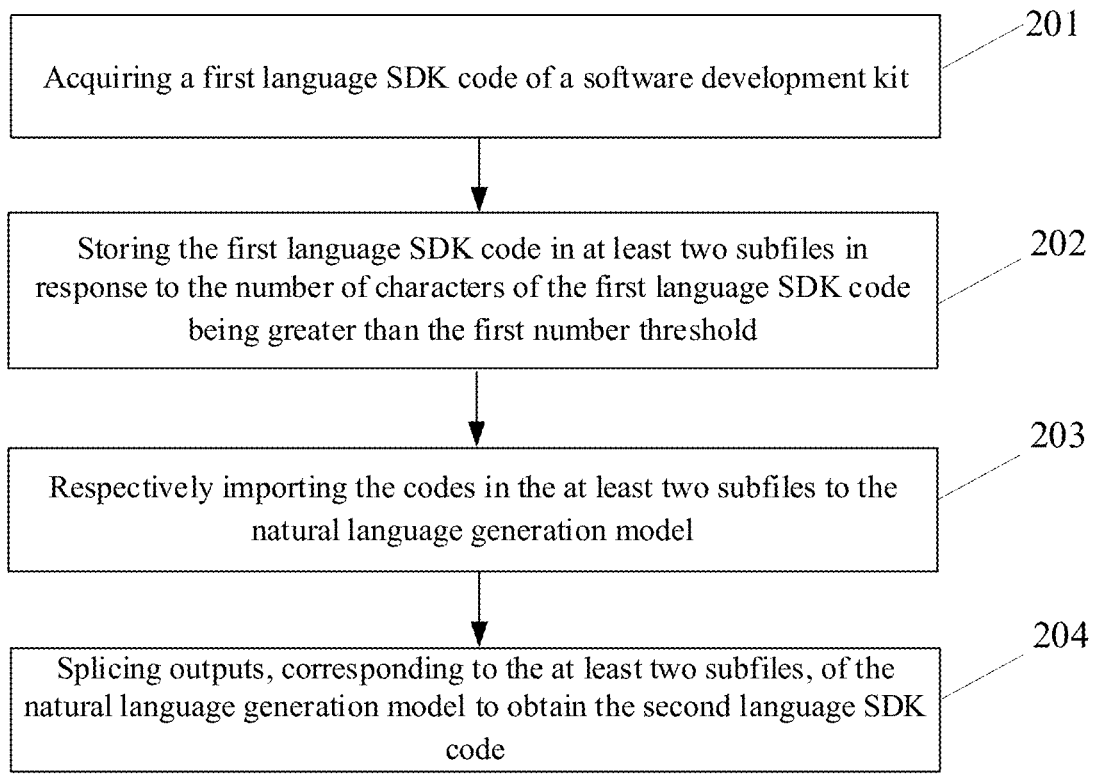
FIG. 2 is a flowchart of a code generation method provided by embodiments of the present disclosure.

With reference to FIG. 2, which is a flowchart of a code generation method provided by embodiments of the present disclosure. As shown in FIG. 2, the code generation method includes the following steps.

Step 201, acquiring a first language SDK code of a software development kit.

In this embodiment, an execution subject (e.g., a server and/or a terminal device) for the code generation method may acquire the first language SDK code of the software development kit, the software development kit includes an application programming interface.

Here, the software development kit includes an application programming interface which is configured to call a resource of an open platform.

At step 202, storing the first language SDK code in at least two subfiles in response to the number of characters of the first language SDK code being greater than the first number threshold.

Here, the natural language generation model is configured to generate responsive answer information according to the guidance information.

Step 203, respectively importing the codes in the at least two subfiles to the natural language generation model.

Step 204, splicing outputs, corresponding to the at least two subfiles, of the natural language generation model to obtain the second language SDK code.

Here, the first guidance information includes a second language type and interface naming specifying information.

Here, the interface naming specifying information is used to specify that a naming way for the application programming interface is identical in the first language SDK code and the second language SDK code.

It should be noted that according to the code generation method provided in this embodiment, the first language SDK code is split into at least two pieces of code with low correlation for transformation in batches. Transformation results of transformation in batches are then spliced. When the first language SDK code is of a great quantity, the code is transformed using the natural language generation model having a limitation on input characters, thereby improving the applicability of transformation using the natural language generation model. Moreover, the correlation between the codes of different batches can be reduced, and the reduction of the accuracy rate of code transformation due to strong dependency of the code in a subfile on other codes can be avoided. Thus, the transformation accuracy is improved.

Figure 5:
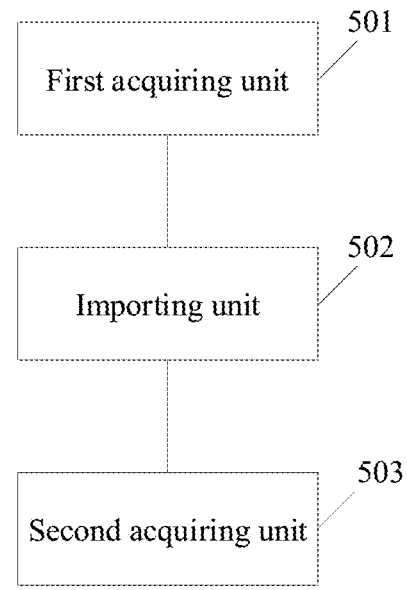
FIG. 5 is a structural schematic diagram of a code generation apparatus provided by embodiments of the present disclosure.

Further, referring to FIG. 5, to implement the code generation method described above with reference to the drawings, embodiments of the present disclosure provide a code generation apparatus. The apparatus embodiments correspond to the method embodiments shown in FIG. 1. The code generation apparatus may be applied to various electronic devices.

As shown in FIG. 5, the code generation apparatus includes a first acquiring unit 501, an importing unit 502, and a second acquiring unit 503. The first acquiring unit is configured to acquire a first language SDK code of a software development kit, in which the software development kit includes an application programming interface, the application programming interface is configured to call a resource of an open platform; the importing unit is configured to import the first language SDK code and preset first guidance information to a natural language generation model, in which the natural language generation model is configured to generate responsive answer information according to the guidance information; and the second acquiring unit is configured to acquire a second language SDK code output by the natural language generation model; in which the first guidance information includes a second language type and interface naming specifying information, and the interface naming specifying information is used to specify that a naming way for the application programming interface is identical in the first language SDK code and the second language SDK code.

In this embodiment, for the specific processing of the first acquiring unit 501, the importing unit 502, and the second acquiring unit 503 of the code generation apparatus, and the resulting technical effects, please refer to the related descriptions of step 101, step 102, and step 103 in the embodiment corresponding to FIG. 1, which will not be repeated here.

In some embodiments, the first language SDK code is imported to the natural language generation model in a single operation.

In some embodiments, the natural language generation model has a first number threshold for limiting the number of characters in a single input; the importing the first language SDK code and the preset first guidance information to the natural language generation model includes: storing the first language SDK code in at least two subfiles in response to the number of characters of the first language SDK code being greater than the first number threshold, in which codes in different subfiles have no calling relationship; and respectively importing the codes in the at least two subfiles to the natural language generation model; and the acquiring a second language SDK code output by the natural language generation model includes: splicing outputs, corresponding to the at least two subfiles, of the natural language generation model to obtain the second language SDK code.

In some embodiments, the first guidance information further includes field naming specifying information, the field naming specifying information is used to specify that a field in a software development application package is identical in the first language SDK code and the second language SDK code.

In some embodiments, the first language type of the first language SDK code is a static language.

In some embodiments, the first language type of the first language SDK code is determined according to an estimated SDK code quantity of each language type.

In some embodiments, the first language type includes GO type, and the second language type includes any one selected from a group consisting of NodeJS, Java, Python, PHP, and Rust.

In some embodiments, the code generation apparatus is further configured to: acquire a first language test case for testing the first language SDK code; import the first language test case and second guidance information to the natural language generation model, in which the second guidance information includes a second language type; acquire a second language test case output by the natural language generation model; and test the second language SDK code based on the second language test case.

Figure 6:
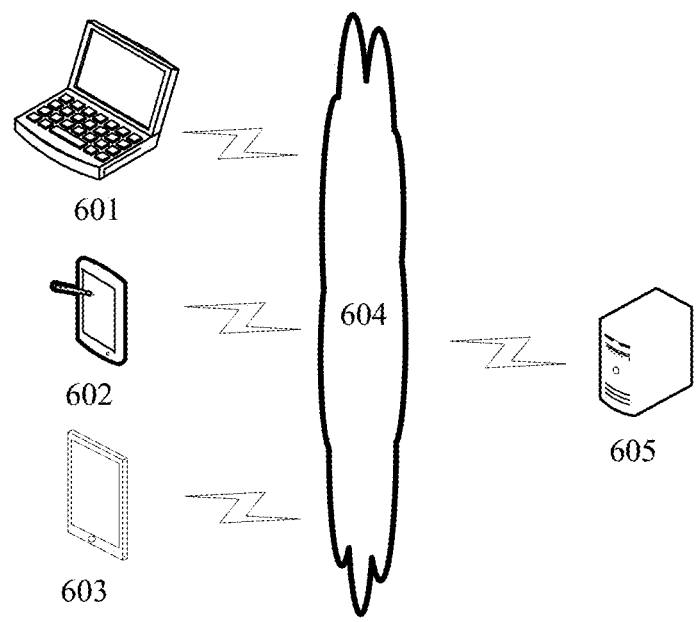
FIG. 6 is an exemplary system architecture to which a code generation method provided by embodiments of the present disclosure can be applied.

With reference to FIG. 6, FIG. 6 shows an exemplary system architecture to which the code generation method provided by the embodiments of the present disclosure can be applied.

As shown in FIG. 6, the system architecture may include terminal devices 601, 602, 603, a network 604, and a server 605. The network 604 is configured to provide a medium of a communication link between the terminal devices 601, 602, 603 and the server 605. The network 604 may include various connection types, for example, a wired or wireless communication link or a fiber-optic cable, etc.

The terminal devices 601, 602, 603 may interact with the server 605 through the network 604 to receive or transmit a message, etc. Various client applications, such as a web browser application, a search application, and a news information application, can be installed on the terminal devices 601, 602, 603. The client applications on the terminal devices 601, 602, 603 can receive instructions from a user and accomplish corresponding functions according to the instructions from the user, e.g., adding corresponding information in information according to an instruction from the user.

The terminal devices 601, 602, 603 may be either hardware or software. When the terminal devices 601, 602, 603 are hardware, the devices may be any electronic device having a display screen and supporting web browsing, including, but not limited to, a smartphone, a tablet computer, an ebook reader, a moving picture experts group audio layer III (MP3) player, a moving picture experts group audio layer IV (MP4) player, a laptop computer, and a desktop computer, etc. When the terminal devices 601, 602, 603 are software, the devices may be installed on the electronic devices listed above. The devices may be implemented as multiple pieces of software or multiple software modules (for example, software or software modules for providing distributed services), or may be implemented as a single piece of software or a single software module. The embodiments of the present disclosure are not limited in this aspect.

The server 605 may be a server providing various services, e.g., receiving information acquiring requests sent by the terminal devices 601, 602, 603 and acquiring showing information corresponding to the information acquiring requests in various ways according to the information acquiring requests. The related data of the showing information is sent to the terminal devices 601, 602, 603.

It should be noted that the code generation method provided by the embodiments of the present disclosure may be performed by the terminal device. Correspondingly, the code generation apparatus may be disposed in the terminal devices 601, 602, 603. Moreover, the code generation method provided by the embodiments of the present disclosure may also be performed by the server 605, correspondingly, the code generation apparatus may be disposed in the server 605.

It should be understood that the number of the terminal devices, network and server in FIG. 6 is merely exemplary. Any quantity of terminal device(s), network(s) and server(s) may be provided according to implementation requirements.

Figure 7:
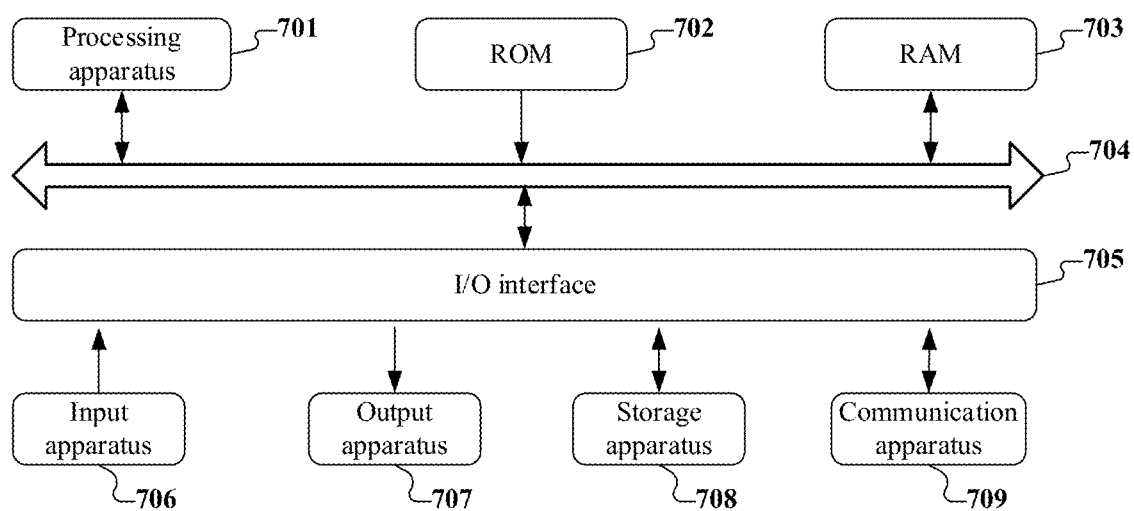
FIG. 7 is a schematic diagram of a basic structure of an electronic device provided by embodiments of the present disclosure.

Referring to FIG. 7, FIG. 7 illustrates a structural schematic diagram of an electronic device (for example, the terminal device or server in FIG. 6) suitable for implementing some embodiments of the present disclosure. The terminal device in some embodiments of the present disclosure may include but is not limited to a mobile terminal such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and a fixed terminal such as a digital TV, a desktop computer, or the like. The electronic device illustrated in FIG. 7 is merely an example, and should not pose any limitation to the functions and the range of use of the embodiments of the present disclosure.

As illustrated in FIG. 7, the electronic device may include a processing apparatus 701 (e.g., a central processing unit, a graphics processing unit, etc.), which can perform various suitable actions and processing according to a program stored in a read-only memory (ROM) 702 or a program loaded from a storage apparatus 708 into a random-access memory (RAM) 703. The RAM 703 further stores various programs and data required for operations of the electronic device 700. The processing apparatus 701, the ROM 702, and the RAM 703 are interconnected by means of a bus 704. An input/output (I/O) interface 705 is also connected to the bus 704.

Usually, the following apparatus may be connected to the I/O interface 705: an input apparatus 706 including, for example, a touch screen, a touch pad, a keyboard, a mouse, a camera, a microphone, an accelerometer, a gyroscope, or the like; an output apparatus 707 including, for example, a liquid crystal display (LCD), a loudspeaker, a vibrator, or the like; a storage apparatus 708 including, for example, a magnetic tape, a hard disk, or the like; and a communication apparatus 709. The communication apparatus 709 may allow the electronic device to be in wireless or wired communication with other devices to exchange data. While FIG. 7 illustrates the electronic device 500 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 709 and installed, or may be installed from the storage apparatus 708, or may be installed from the ROM 702. When the computer program is executed by the processing apparatus 701, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquire a first language SDK code of a software development kit, in which the software development kit includes an application programming interface, the application programming interface is configured to call a resource of an open platform; import the first language SDK code and preset first guidance information to a natural language generation model, in which the natural language generation model is configured to generate responsive answer information according to the guidance information; and acquire a second language SDK code output by the natural language generation model; in which the first guidance information includes a second language type and interface naming specifying information, and the interface naming specifying information is used to specify that a naming way for the application programming interface is identical in the first language SDK code and the second language SDK code.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the first acquiring unit may also be described as a "unit for acquiring code".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A method of improving an application programming interface calling mechanism of a platform configured to provide data or software services, comprising:
    acquiring a first software development kit (SDK) code in a first programming language, wherein the first SDK code is comprised in a software development kit (SDK), wherein the kit SDK comprises an application programming interface of the platform, and wherein the application programming interface of the platform is configured to call a resource of the platform and enable an external program to utilize the resource of the platform;
    importing the first SDK code and a first prompt to a natural language generation model, wherein the natural language generation model is pre-trained to translate SDK codes from one type of programming language to another type of programming language; and
    acquiring a second SDK code in a second programming language generated by the natural language generation model based on the first SDK code and the first prompt imported to the natural language generation model,
    wherein the first prompt is configured to specify the second programming language, wherein the first prompt is further configured to specify that a way of naming the application programming interface of the platform is identical in the first SDK code and the second SDK code, and wherein the first SDK code and the second SDK code share the same code logic and the same application programming interface of the platform while the first SDK code and the second SDK code are in different programming languages.

2. The method according to claim 1, wherein the first SDK code is imported to the natural language generation model in a single operation.

3. The method according to claim 1,
    wherein the natural language generation model has a first number threshold for limiting a total number of characters in a single input;
    wherein the importing the first SDK code and the first prompt to the natural language generation model comprises:
    storing the first SDK code in at least two subfiles in response to a total number of characters of the first SDK code being greater than the first number threshold, wherein codes in different subfiles have no calling relationship; and
    respectively importing codes in the at least two subfiles to the natural language generation model; and
    wherein the acquiring the second SDK code in the second programming language generated by the natural language generation model comprises:
    splicing outputs, corresponding to the at least two subfiles, of the natural language generation model to obtain the second SDK code.

4. The method according to claim 1, wherein the first prompt comprises field naming specifying information; and
    wherein the field naming specifying information is used to specify that a field in a software development application package is identical in the first SDK code and the second SDK code.

5. The method according to claim 1, wherein a first language type of the first SDK code is a static language.

6. The method according to claim 5, wherein the first language type of the first SDK code is determined according to an estimated SDK code quantity of each language type.

7. The method according to claim 1, further comprising:
acquiring a first language test case for testing the first SDK code;
importing the first language test case and a second prompt to the natural language generation model, wherein the second prompt comprises a first language type;
acquiring a second language test case output by the natural language generation model; and
testing the second SDK code based on the second language test case.

8. An electronic device of improving an application programming interface calling mechanism of a platform configured to provide data or software services, comprising:
one or more processors; and
a storage apparatus configured to store one or more programs, wherein the one or more programs, when executed by the one or more processors, cause the one or more processors to:
acquire a first software development kit (SDK) code in a first programming language, wherein the first SDK code is comprised in a software development kit (SDK), wherein the SDK comprises an application programming interface of the platform, and wherein the application programming interface of the platform is configured to call a resource of the platform and enable an external program to utilize the resource of the platform;
import the first SDK code and a first prompt to a natural language generation model, wherein the natural language generation model is pre-trained to translate SDK codes from one type of programming language to another type of programming language; and
acquire a second SDK code in a second programming language generated by the natural language generation model based on the first SDK code and the first prompt imported to the natural language generation model,
wherein the first prompt is configured to specify the second programming language, wherein the first prompt is further configured to specify that a way of naming the application programming interface of the platform is identical in the first SDK code and the second SDK code, and wherein the first SDK code and the second SDK code share the same code logic and the same application programming interface of the platform while the first SDK code and the second SDK code are in different programming languages.

9. The electronic device according to claim 8, wherein the first SDK code is imported to the natural language generation model in a single operation.

10. The electronic device according to claim 8, wherein the natural language generation model has a first number threshold for limiting a total number of characters in a single input; and
wherein the one or more processors are further caused to:
store the first SDK code in at least two subfiles in response to a total number of characters of the first SDK code being greater than the first number threshold, wherein codes in different subfiles have no calling relationship; and
respectively import codes in the at least two subfiles to the natural language generation model; and
splice outputs, corresponding to the at least two subfiles, of the natural language generation model to obtain the second SDK code.

11. The electronic device according to claim 8, wherein the first prompt comprises field naming specifying information; and
wherein the field naming specifying information is used to specify that a field in a software development application package is identical in the first SDK code and the second SDK code.

12. The electronic device according to claim 8, wherein a first language type of the first SDK code is a static language.

13. The electronic device according to claim 12, wherein the first language type of the first SDK code is determined according to an estimated SDK code quantity of each language type.

14. The electronic device according to claim 8, wherein the one or more processors are further caused to:
acquire a first language test case for testing the first SDK code;
import the first language test case and a second prompt to the natural language generation model, wherein the second prompt comprises a first language type;
acquire a second language test case output by the natural language generation model; and
test the second SDK code based on the second language test case.

15. A non-transitory computer-readable medium storing a computer program, wherein the computer program, when executed by a processor, causes the processor to implement operations, the operations comprising:
acquiring a first software development kit (SDK) code in a first programming language, wherein the first SDK code is comprised in a software development kit (SDK), wherein the SDK comprises an application programming interface of a platform, and wherein the application programming interface of the platform is configured to call a resource of the platform and enable an external program to utilize the resource of the platform;
importing the first SDK code and a first prompt to a natural language generation model, wherein the natural language generation model is pre-trained to translate SDK codes from one type of programming language to another type of programming language; and
acquiring a second SDK code in a second programming language generated by the natural language generation model based on the first SDK code and the first prompt imported to the natural language generation model,
wherein the first prompt is configured to specify the second programming language, wherein the first prompt is further configured to specify that a way of naming the application programming interface of the platform is identical in the first SDK code and the second SDK code, and wherein the first SDK code and the second SDK code share the same code logic and the same application programming interface of the platform while the first SDK code and the second SDK code are in different programming languages.

* * * * *